Sept. 9, 1930.  A. DÄNIKER  1,775,553
RAPID ELECTRIC HEAT REGULATOR
Filed Feb. 1, 1929
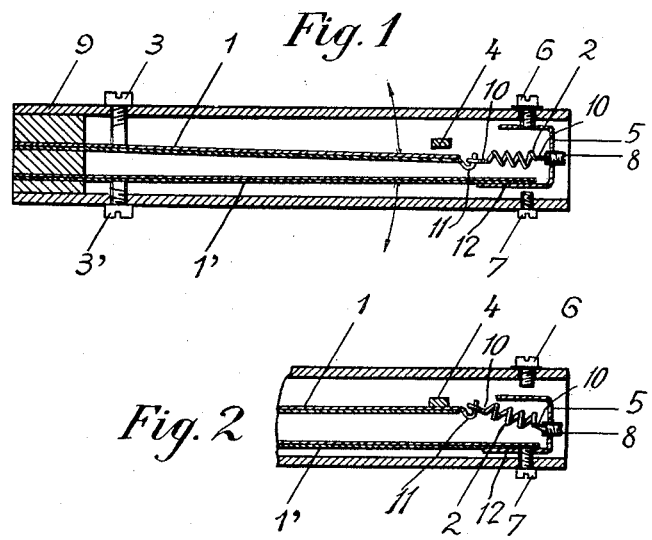

Patented Sept. 9, 1930

1,775,553

UNITED STATES PATENT OFFICE

ALFRED DÄNIKER, OF ZURICH, SWITZERLAND

RAPID ELECTRIC HEAT REGULATOR

Application filed February 1, 1929, Serial No. 336,822, and in Germany February 6, 1928.

Rapid electric heat regulators are known which possess bimetallic contact springs on which the action of the regulator depends. A compression spring is intercalated between these springs, having, however, a movable fulcrum only at one extremity. This causes the inconvenience that in many cases the contact between the bimetallic springs is not opened and closed with sufficient rapidity. The object of the present invention is to do away with this inconvenience.

The invention consists in having both ends of the known compression spring intercalated between the bimetallic springs at movable points of support at the free ends or near the same of the bimetallic springs for the purpose of obtaining a rapidly operating opening and closing of the contacts.

Its advantages are the following: Owing to the arrangement of the bimetallic springs close to each other in the same direction the regulator can be made considerably smaller. The helical spring held free on both sides is subject to equable and very little wear, as both bimetallic springs move from, and toward, each other and the space for the switching on and off is very short. The tipping moment occurs already with a very slight heating of the bimetallic springs, without sparking. In this way it is possible to maintain a shorter period between switching on and off, i. e. the regulator operates more precisely, and it is possible to maintain an approximately constant warmth, e. g. from 5 to 8 degrees difference of heat. This is of special importance for medical purposes, in which the constant warming of a diseased organ is a condition,—which is fulfilled by the invention herein described.

In the drawings the invention is represented in an executory example. Fig. 1 shows the regulator closed in longitudinal section, Fig. 2 is a partial view of the regulator, opened. The thermostatic contact springs or strips (bimetallic springs) are marked 1 and 1'; the helical spring inserted between the ends of the bimetallic springs is marked 2; 3 and 3' are screws for tensioning the bimetallic springs; 4 is a stop for one of the springs 1, 1'; 5 is a bow for limiting the motion of the spring between the screws 6 and 7; 8 is a small screw for tensioning the spring 2. The screw 6 is insulated; its function is to connect the current. The case is marked 9; 10 marks the free extremities of the compression spring 2 which are supported on the movable ends 11 and 12 of the bimetallic springs.

If the regulator in the case 9 is connected with a current circuit the bimetallic springs 1 and 1', which may have any form, expand in the direction of the arrows. It must be noted that if, for instance, a heating cushion is warmed by electricity, and that only when it has attained the necessary heat are the bimetallic springs so far heated by the cushion till superheating intervenes and the current is interrupted by the expansion of the bimetallic springs. The release of the contact occurs with a small decrease of heating, and switching over by the subsequent cooling off.

The circulation of the current is the following: Entry at 6 through the bow 5 to the bimetallic spring 1, to the screw 3', to the case 9. Exit at 7. In Fig. 2 the bow 5 is separated from the contact 6 and the current circulation is interrupted.

I claim:

1. The combination with a pair of thermostatic strips; of a compression spring connected between the springs near their ends, and stationary opposite electrical contacts between which the end of one of said strips may move.

2. The combination with a pair of adjacent thermostatic strips secured at one end and whose free ends are adjacent; of a bow secured to one strip, stationary and adjustable electrical contacts between which said bow may move, a stationary stop for the other strip and a compression spring mounted between the bow and the other strip for toggle action.

3. The combination with a pair of thermostatic strips fixedly secured at one end; of means to adjust the tension of the strips, a bow secured to the free end of one of the strips, stationary electrical contacts between which said bow may move, an adjusting screw in the bow, a compression spring loosely connected at one end to said screw and at its other end to the other strip.

4. The combination with a casing open at one end; of a pair of spaced thermostatic strips connected at one end to the other end of the casing and means in the casing to adjust the tension of the strips; of a bow connected at the free end of one of the strips, stationary electrical contacts in the casing and between which said bow moves, one of said contacts being insulated from the casing, a screw in the bow, a helical compression spring connected for toggle action at one end to said screw and to the free end of the other strip.

In testimony that I claim the foregoing as my invention, I have signed my name.

ALFRED DÄNIKER.